(12) United States Patent
Varanasi

(10) Patent No.: US 10,377,664 B2
(45) Date of Patent: Aug. 13, 2019

(54) COATED GLASS ARTICLE, DISPLAY ASSEMBLY MADE THEREWITH AND METHOD OF MAKING A DISPLAY ASSEMBLY

(71) Applicant: PILKINGTON GROUP LIMITED, Lathom (GB)

(72) Inventor: Srikanth Varanasi, Ottawa Hills, OH (US)

(73) Assignee: Pilkington Group Limited, Lathom (GB)

( * ) Notice: Subject to any disclaimer, the term of this patent is extended or adjusted under 35 U.S.C. 154(b) by 272 days.

(21) Appl. No.: 15/523,990

(22) PCT Filed: Oct. 29, 2015

(86) PCT No.: PCT/GB2015/053249
§ 371 (c)(1),
(2) Date: May 3, 2017

(87) PCT Pub. No.: WO2016/075435
PCT Pub. Date: May 19, 2016

(65) Prior Publication Data
US 2017/0355638 A1    Dec. 14, 2017

Related U.S. Application Data

(60) Provisional application No. 62/078,489, filed on Nov. 12, 2014.

(51) Int. Cl.
*C03C 17/34* (2006.01)
*C03C 17/245* (2006.01)
(Continued)

(52) U.S. Cl.
CPC ........ *C03C 17/3417* (2013.01); *C03C 17/245* (2013.01); *C03C 17/2453* (2013.01);
(Continued)

(58) Field of Classification Search
CPC ............. C03C 17/3417; G02B 5/0825; G02B 5/0833; B32B 17/10201; B32B 17/10211
See application file for complete search history.

(56) References Cited

U.S. PATENT DOCUMENTS 4,921,331 A * 5/1990 Nakajima ................ A47G 1/02
359/584
5,073,451 A * 12/1991 Iida ................... B32B 17/10036
359/359
(Continued)

OTHER PUBLICATIONS

European Patent Office, International Search Report with Written Opinion, issued in PCT/GB2015/053249, dated Dec. 18, 2015, 8 pages, Rijswijk, Netherlands.

*Primary Examiner* — Z. Jim Yang
(74) *Attorney, Agent, or Firm* — Marshall & Melhorn, LLC

(57) ABSTRACT

A coated glass article including a glass substrate and a coating deposited over the glass substrate. The coating includes a first inorganic metal oxide layer deposited over a major surface of the glass substrate. A second inorganic metal oxide layer is deposited over the first inorganic metal oxide layer. A third inorganic metal oxide layer is deposited over the second inorganic metal oxide layer. A fourth inorganic metal oxide layer is deposited over the third inorganic metal oxide layer. The coated glass article exhibits a total visible light transmittance (Illuminant C) of 40% or more and a visible light reflectance (Illuminant C) of 30% or more.

18 Claims, 2 Drawing Sheets

(52) U.S. Cl.
CPC .... *C03C 17/2456* (2013.01); *C03C 2217/211* (2013.01); *C03C 2217/212* (2013.01); *C03C 2217/213* (2013.01); *C03C 2217/734* (2013.01); *C03C 2218/1525* (2013.01)

(56) References Cited

U.S. PATENT DOCUMENTS

| | | | | |
|---|---|---|---|---|
| 5,387,433 | A * | 2/1995 | Balian | C03C 17/3423 427/126.2 |
| 5,505,989 | A * | 4/1996 | Jenkinson | C03C 17/3435 427/166 |
| 5,525,406 | A * | 6/1996 | Goodman | C03C 17/3417 296/152 |
| 5,780,149 | A | 7/1998 | McCurdy et al. | |
| 5,891,556 | A * | 4/1999 | Anderson | B32B 17/10036 204/192.15 |
| 6,033,785 | A * | 3/2000 | Tanaka | B32B 17/10174 428/426 |
| 6,037,289 | A * | 3/2000 | Chopin | C01G 23/047 502/2 |
| 6,064,525 | A * | 5/2000 | Depauw | B60Q 1/2665 250/216 |
| 6,074,730 | A * | 6/2000 | Laird | C03C 17/3417 428/212 |
| 6,292,302 | B1 * | 9/2001 | Krisko | B60R 1/088 359/580 |
| 6,396,633 | B1 * | 5/2002 | Yamamoto | G02B 5/08 359/580 |
| 6,416,890 | B1 * | 7/2002 | Terneu | C03C 17/3417 428/701 |
| 6,858,306 | B1 | 2/2005 | Strickler et al. | |
| 6,924,037 | B1 * | 8/2005 | Joret | B32B 17/10 428/432 |
| 7,005,188 | B2 | 2/2006 | Anderson et al. | |
| 7,397,461 | B1 | 7/2008 | Graham | |
| 8,158,262 | B2 * | 4/2012 | Varanasi | C03C 17/3417 428/432 |
| 2001/0031365 | A1 | 10/2001 | Anderson | B32B 17/10036 428/432 |
| 2002/0008018 | A1 * | 1/2002 | Murayama | C03C 17/245 204/192.26 |
| 2002/0181108 | A1 * | 12/2002 | Macchi | G02B 5/0808 359/580 |
| 2002/0182421 | A1 * | 12/2002 | Tixhon | C03C 17/3417 428/432 |
| 2003/0215648 | A1 * | 11/2003 | Varanasi | C03C 17/3417 428/432 |
| 2003/0224181 | A1 * | 12/2003 | Finley | B32B 17/10036 428/432 |
| 2004/0043260 | A1 * | 3/2004 | Nadaud | C03C 17/2456 428/701 |
| 2004/0156984 | A1 * | 8/2004 | Vitt | C03C 17/3417 427/162 |
| 2005/0164012 | A1 * | 7/2005 | Carson | C03C 17/3417 428/432 |
| 2006/0029813 | A1 * | 2/2006 | Kutilek | C03C 17/3417 428/426 |
| 2006/0063010 | A1 * | 3/2006 | Lu | C03C 17/36 428/432 |
| 2006/0065299 | A1 * | 3/2006 | Fukawa | C03C 17/3417 136/256 |
| 2008/0028984 | A1 * | 2/2008 | Meredith | C03C 17/34 106/287.17 |
| 2008/0073203 | A1 * | 3/2008 | Wang | C03C 17/36 204/192.1 |
| 2008/0199671 | A1 * | 8/2008 | Miyagi | B32B 17/10036 428/216 |
| 2010/0296171 | A1 * | 11/2010 | Lee | B82Y 10/00 359/652 |
| 2011/0019284 | A1 * | 1/2011 | Hoeing | B60R 1/12 359/630 |
| 2012/0087009 | A1 * | 4/2012 | Grayson | G02B 1/005 359/584 |
| 2012/0107554 | A1 * | 5/2012 | Pfaff | C03C 17/3417 428/141 |
| 2012/0149556 | A1 * | 6/2012 | Laurent | B01J 37/341 502/200 |
| 2012/0196133 | A1 * | 8/2012 | Broadway | C03C 17/3417 428/428 |
| 2012/0301692 | A1 * | 11/2012 | Dusoulier | C03C 17/3417 428/215 |
| 2013/0129945 | A1 * | 5/2013 | Durandeau | C03C 17/3417 428/34 |
| 2014/0226208 | A1 * | 8/2014 | Vikor | C03C 17/3417 359/584 |
| 2014/0227500 | A1 * | 8/2014 | Vikor | G02B 5/0833 428/216 |
| 2015/0062709 | A1 * | 3/2015 | Matsuyuki | C03C 17/3417 359/584 |
| 2015/0322270 | A1 * | 11/2015 | Amin | C09D 5/006 428/141 |
| 2015/0345206 | A1 * | 12/2015 | Vikor | A01M 29/08 428/34 |
| 2016/0107928 | A1 * | 4/2016 | Bayne | C03C 17/09 428/429 |
| 2017/0010393 | A1 * | 1/2017 | Varanasi | C03C 17/3417 |
| 2017/0204000 | A1 * | 7/2017 | Varanasi | C03C 17/3417 |

* cited by examiner

COATED GLASS ARTICLE, DISPLAY ASSEMBLY MADE THEREWITH AND METHOD OF MAKING A DISPLAY ASSEMBLY

CROSS-REFERENCE TO RELATED APPLICATION

This application is claiming the benefit, under 35 U.S.C. 119(e), of the provisional application which was granted Ser. No. 62/078,489 and filed on Nov. 12, 2014, the entire disclosure of which is hereby incorporated by reference.

BACKGROUND OF THE INVENTION

The invention relates to a coated glass article having similar visible light transmittance and reflectance properties. The invention also relates to a display assembly comprising the coated glass article and a method of making the display assembly.

Flat screen video displays are now found in many locations in public and commercial facilities and in private homes. It has been found to be desirable for such video displays to be less obtrusive when the display is not in operation. One way to accomplish this objective is to conceal the video display by giving it the appearance of an object that might commonly appear in a room such as a mirror. However, under certain conditions such as, for example, when there are relatively high levels of natural light illuminating a space and the video display is in operation, the quality of the video image is not as bright or sharp as would be desirable.

Thus, it would be advantageous to provide a coated glass article that has a mirror-like appearance for concealing a video display when the display is not in use and permits a video image from the display to be bright and sharp when the display is in use and utilized in areas with high levels of natural light. Additionally, a display assembly comprising the coated glass article would also be desirable.

BRIEF SUMMARY OF THE INVENTION

Embodiments of a coated glass article are provided. In an embodiment, the coated glass article comprises a glass substrate and a coating deposited over the glass substrate. The coating comprises a first inorganic metal oxide layer deposited over a major surface of the glass substrate. The first inorganic metal oxide layer has a refractive index of less than 2.1.

A second inorganic metal oxide layer is deposited over the first inorganic metal oxide layer. The second inorganic metal oxide layer has a refractive index which is less than the refractive index of the first inorganic metal oxide layer. A third inorganic metal oxide layer is deposited over the second inorganic metal oxide layer. A fourth inorganic metal oxide layer is deposited over the third inorganic metal oxide layer. The fourth inorganic metal oxide layer has a refractive index which is greater than a refractive index of the third inorganic metal oxide layer. The coated glass article exhibits a total visible light transmittance (Illuminant C) of 40% or more and a visible light reflectance (Illuminant C) of 30% or more.

Also, embodiments of a display assembly and embodiments of a method of making a display assembly are provided.

BRIEF DESCRIPTION OF THE VIEWS OF THE DRAWINGS

The above, as well as other advantages of the present invention will become readily apparent to those skilled in the art from the following detailed description when considered in the light of the accompanying drawings in which.

DETAILED DESCRIPTION OF THE INVENTION

It is to be understood that the invention may assume various alternative orientations and step sequences, except where expressly specified to the contrary. It is also to be understood that the specific layers, articles, methods and processes illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise.

Embodiments of a coated glass article 10 in accordance with the invention will be described below. The embodiments of the coated glass article 10 may be utilized as a single coated glass sheet. In one such embodiment, the coated glass article is utilized as a portion of a display assembly 40. Additionally, the embodiments of the coated glass article 10 may be utilized in, for example, a glazing and/or have architectural, residential, commercial, photovoltaic, automotive and aerospace applications.

Figure 1:
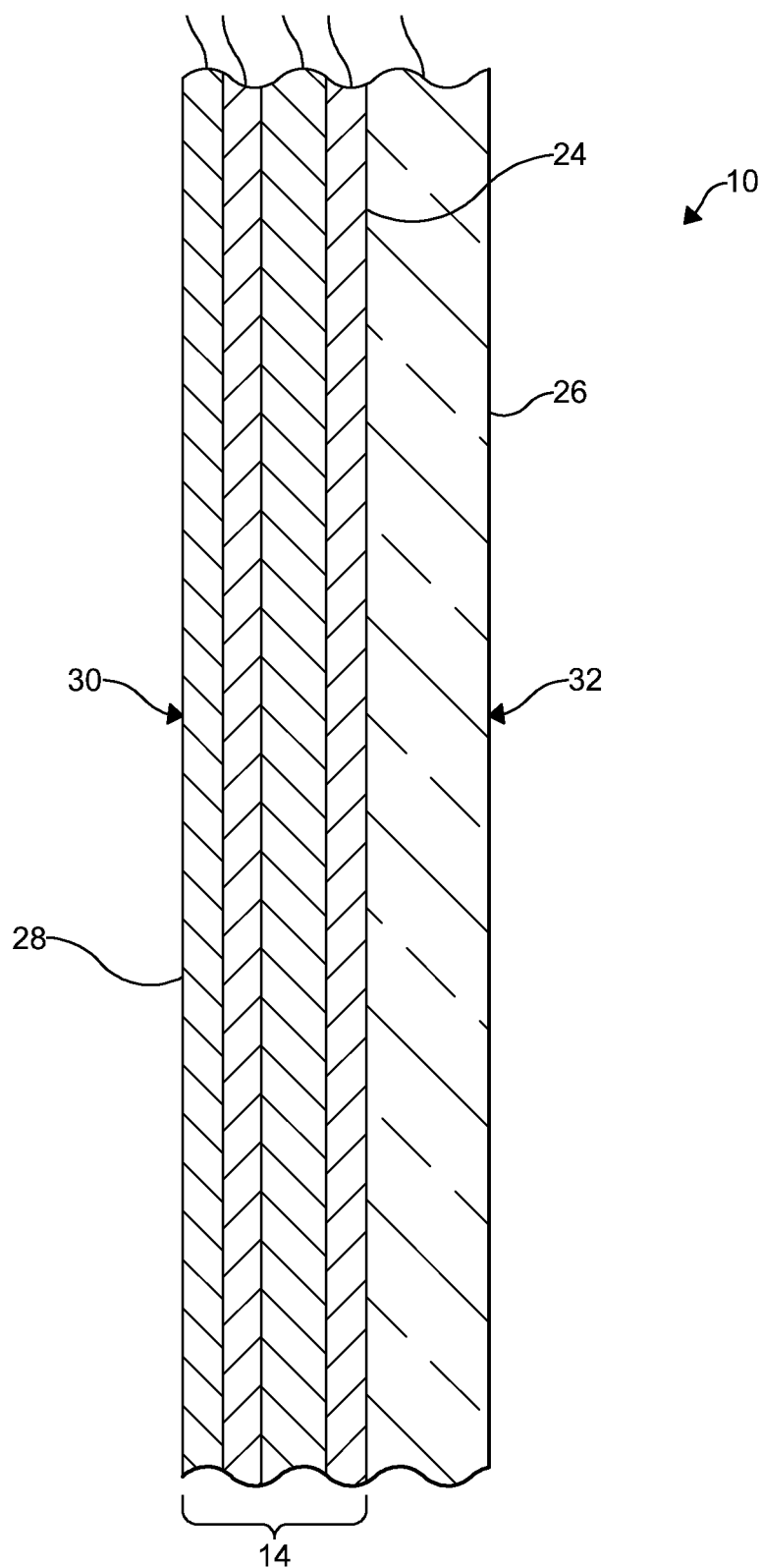
FIG. 1 is a sectional view of an embodiment of a coated glass article in accordance with the invention.

FIG. 1 illustrates certain embodiments of the coated glass article 10. As illustrated in FIG. 1, the coated glass article 10 comprises a glass substrate 12. The glass substrate 12 may be of any of the conventional glass compositions known in the art. In certain embodiments, the composition of the glass substrate 12 is selected to allow the coated glass article 10 to exhibit certain specific spectral properties. The glass substrate 12 may be substantially clear and transparent to visible light. Preferably, the glass substrate 12 is a soda-lime-silica glass. In this embodiment, the substrate 12 may be a float glass ribbon. However, the glass substrate may be of another composition such as, for example, a borosilicate composition. Also, the transparency or absorption characteristics of the glass substrate may vary between embodiments of the coated glass article. For example, a tinted glass substrate may be utilized in the coated glass article. Additionally, the glass substrate thickness may vary between embodiments.

A coating 14 is deposited over the glass substrate 12. In certain embodiments, the coating 14 comprises a first coating layer 16, a second coating layer 18, a third coating layer 20 and a fourth coating layer 22. In other embodiments, the coating 14 consists of the aforementioned coating layers 16-22. The coating layers 16-22 may be deposited by any suitable method but are preferably deposited by atmospheric chemical vapor deposition (APCVD). Other known deposition methods are suitable for depositing one or more of the coating layers such as, for example, sol-gel coating techniques or sputter coating techniques. In embodiments where the substrate 12 is a float glass ribbon, the coating 14 is preferably applied in the heated zone of the float glass process.

The first coating layer 16 is deposited over and, preferably, directly on a first major surface 24 of the glass substrate 12. A second major surface 26 of the glass substrate may be uncoated. In certain embodiments, the first coating layer 16 is a pyrolytic coating. The first coating layer 16 is formed of an inorganic metal oxide and has a refractive index of 2.1 or less. Preferably, in these embodiments, the first coating layer 16 comprises tin oxide ($SnO_2$) or another suitable inorganic metal oxide. Tin oxide is a preferred material for the first coating layer because it has a refractive index which is 2.1 or less. In an embodiment where the first coating layer 16 comprises tin oxide, the first coating layer has a refractive index of between 1.6 and 2.1. Preferably, when the first coating layer 16 comprises tin oxide, the first coating layer has a refractive index which is about 1.8. In embodiments where the first coating layer 16 comprises tin oxide, the thickness of the first coating layer 16 is 20-60 nanometers (nm). Preferably, when the first coating layer 16 comprises tin oxide, the thickness of the first coating layer 16 is 25-50 nm. More preferably, when the first coating layer 16 comprises tin oxide, the thickness of the first coating layer 16 is 25-40 nm.

The second coating layer 18 is deposited over and, preferably, directly on the first coating layer 16. In certain embodiments, the second coating layer 18 is a pyrolytic coating. In an embodiment, the second coating layer 18 is formed of an inorganic metal oxide. The second coating layer 18 has a refractive index which is less than the refractive index of the first coating layer 16. Thus, in certain embodiments, the refractive index of the second coating layer is 1.6 or less. In an embodiment where the first coating layer 16 is tin oxide, the second coating layer 18 comprises silicon dioxide ($SiO_2$). Silicon dioxide is a preferred material because its refractive index is about 1.46. In embodiments where the second coating layer 18 is an inorganic metal oxide layer of silicon dioxide, the thickness of the second coating layer 18 is 50-100 nm. Preferably, for these embodiments, the thickness of the second coating layer 18 is 65-95 nm. More preferably, for these embodiments, the thickness of the second coating layer 18 is 70-90 nm.

The third coating layer 20 is deposited over and, preferably, directly on the second coating layer 18. In certain embodiments, the third coating layer 20 is a pyrolytic coating. The third coating layer 20 has a refractive index that is greater than the refractive index of the second coating layer 18. Preferably, the refractive index of the third coating layer 20 is selected to be between the refractive index of the second coating layer 18 and the refractive index of the fourth coating layer 22. In an embodiment, the third coating layer 20 has a refractive index which is less than 2.1 and between 1.6 and 2.1. For example, the refractive index of the third coating layer may be about from about 1.8-2.1. In these embodiments, it is preferred that the third coating layer 20 comprises an inorganic metal oxide such as tin oxide or another suitable inorganic metal oxide. It is preferred that the third coating layer 20 is deposited on the second coating layer 18 at a thickness of 40 nm or less. Preferably, the third coating layer 20 is deposited on the second coating layer 18 at a thickness of 20-40 nm. More preferably, the third coating layer 20 is deposited on the second coating layer 18 at a thickness of 25-35 nm.

The fourth coating layer 22 is deposited over and, preferably, directly on the third coating layer 20. Preferably, the fourth coating layer 22 forms the outermost layer and an outer surface 28 of the coated glass article 10. In certain embodiments, the fourth coating layer 22 is a pyrolytic coating. Preferably, the fourth coating layer 22 has a refractive index which is relatively high. In an embodiment, the refractive index of the fourth coating layer 22 is, for example, 2.1 or more. The refractive index of the fourth coating layer 22 is greater than the refractive index of the third coating layer 20. Preferably, the refractive index of the fourth coating layer 22 is also greater than the refractive index of the first coating layer 16. The refractive index of the fourth coating layer 22 is also greater than the refractive index of the second coating layer 18. The fourth coating layer 22 comprises an inorganic metal oxide. In an embodiment, the fourth coating layer 22 comprises titanium dioxide ($TiO_2$), chromium oxide ($Cr_2O_3$), niobium oxide ($Nb_2O_5$) or another suitable inorganic metal oxide. Preferably, the fourth coating layer 22 comprises titanium dioxide. In certain embodiments, the fourth coating layer 22 is deposited on the third coating layer 20 at a thickness of 30 nm or more. Preferably, the fourth coating layer 22 is deposited at a thickness of 30-60 nm. More preferably, the thickness of the fourth coating layer 22 is 35-50 nm.

The embodiments of the coated glass article 10 exhibit similar visible light transmittance and reflectance properties. For describing the coated glass article 10, total visible light transmittance will refer to the percentage of visible light passing through the article as measured from the side 30 of the article that has the coating deposited on the surface of the glass substrate. Also, for describing the coated glass article 10, film side visible light reflectance will refer to the percentage of visible light reflected from the coated glass article as measured from the side 30 of the article that has the coating deposited on the surface of the glass substrate. Further, for describing the coated glass article 10, glass side visible light reflectance will refer to the percentage of visible light reflected from the coated glass article as measured from the uncoated side 32 of the article.

The coated glass article 10 exhibits a total visible light transmittance (Illuminant C) of 40% or more. Preferably, the coated glass article 10 exhibits a total visible light transmittance (Illuminant C) of 45% or more. More preferably, the coated glass article 10 exhibits a total visible light transmittance (Illuminant C) of 50% or more. However, in certain embodiments, the coated glass article 10 exhibits a total visible light transmittance (Illuminant C) of 45-60%. In these embodiments, it is preferred that the coated glass article 10 exhibits a total visible light transmittance (Illuminant C) of 45-55%.

Additionally, the coated glass article 10 exhibits a film side visible light reflectance (Illuminant C) of 30% or more. Preferably, the coated glass article 10 exhibits a film side visible light reflectance (Illuminant C) of 35% or more. More preferably, the coated glass article 10 exhibits a film side visible light reflectance (Illuminant C) of 40% or more. Even more preferably, the coated glass article 10 exhibits a film side visible light reflectance (Illuminant C) of 42% or more.

In certain embodiments, the coated glass article 10 exhibits a film side visible light reflectance (Illuminant C) of 35-60%. In these embodiments, the coated glass article 10 may exhibit a film side visible light reflectance (Illuminant C) of 42-55%. More preferably, in these embodiments, the coated glass article 10 exhibits a film side visible light reflectance (Illuminant C) of 42-50%.

Also, the coated glass article 10 may exhibit a glass side visible light reflectance (Illuminant C) of 35% or more. In these embodiments, the coated glass article 10 exhibits a glass side visible light reflectance (Illuminant C) of 42% or more. In certain embodiments, the coated glass article 10 exhibits a glass side visible light reflectance (Illuminant C)

of 35-60%. In these embodiments, the coated glass article 10 may exhibit a glass side visible light reflectance (Illuminant C) of 35-55%. More preferably, in these embodiments, the coated glass article 10 exhibits a glass side visible light reflectance (Illuminant C) of 42-55%. Even more preferably, in these embodiments, the coated glass article 10 exhibits a glass side visible light reflectance (Illuminant C) of 42-50%.

The coated glass article 10 may also exhibit other properties which are advantageous. For example, it should also be noted that the coated glass article 10 not only exhibits similar visible light transmittance and reflectance properties but may also exhibit a neutral transmitted color for the visible light transmitted through the coated glass article 10 when viewed at a 90 degree angle incident from the article. For the purpose of describing the embodiments of the coated glass article 10 disclosed herein, a neutral color for the visible light transmitted through or reflected from the coated glass article is defined under the CIELAB color scale system with an a* value in the range of about 6 to about −6 and a b* value in the range of about 6 to −6. Also, it should also be noted that, for certain embodiments or applications described herein, a non-neutral reflected and/or transmitted color may be desirable and can be exhibited by the coated glass article. In certain embodiments, the coated glass article 10 exhibits a transmitted color to the coating side 30 of the article 10 in a range from about 0 to about 8 for the a* value and a range from about −7 to about 5 for the b* value. In other embodiments, the reflected color from the coating side 30 of the article 10 is in a range from about −9 to about −6 for the a* value and a range from about −4 to about 13 for the b* value. Also, the coated glass article 10 may exhibit a low haze value. For example, the coated glass article may exhibit haze of 1.0% or less.

Figure 2:
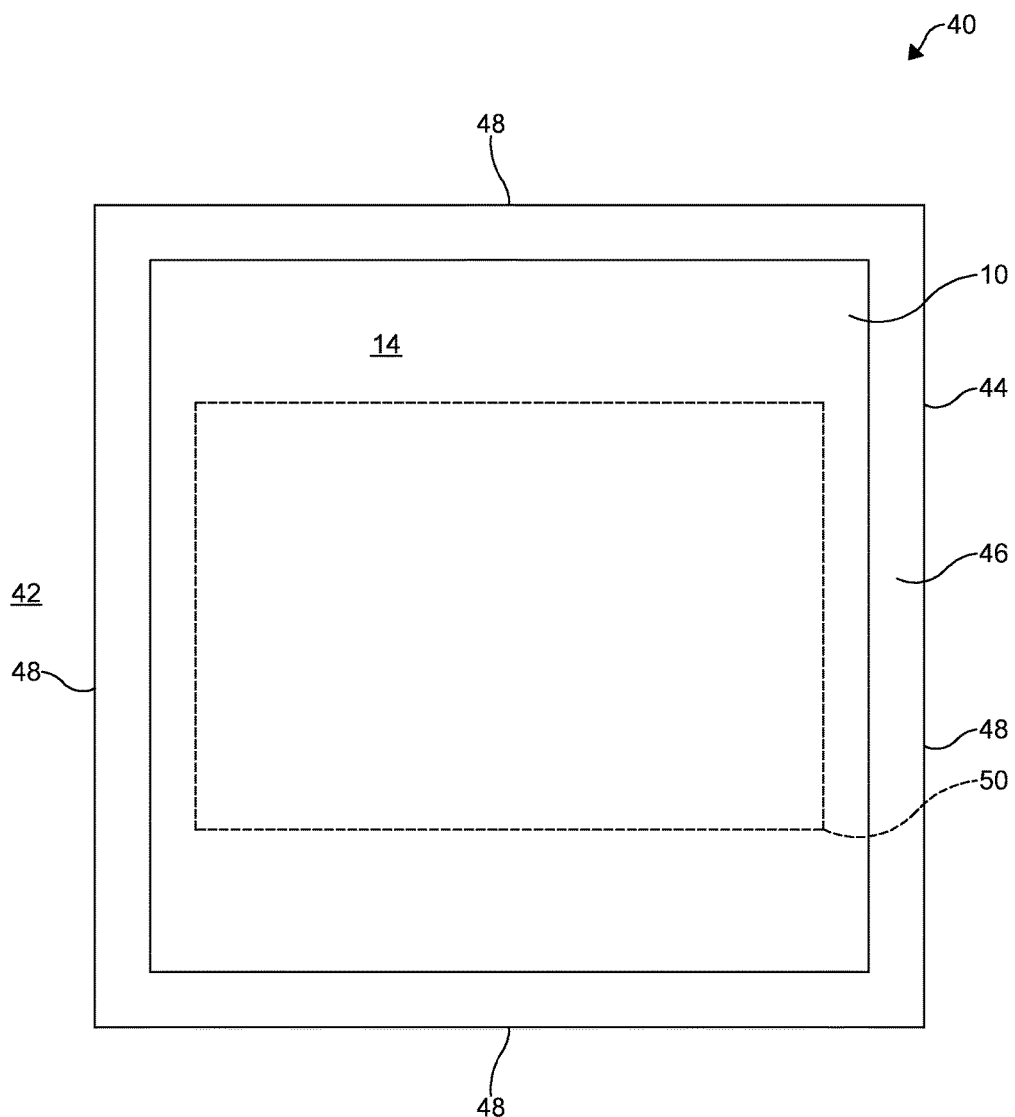
FIG. 2 is a front view of an embodiment of a display assembly in accordance with the invention.

Referring now to FIG. 2, in certain embodiments, the coated glass article 10 is utilized in the display assembly 40. Preferably, the display assembly 40 is attached to a mounting member 42 such as, for example, a wall. A display 50 such as, for example, a flat screen video display may also be attached to the mounting member 42 and/or the display assembly 40. The display 50 is provided between the mounting member 42 and the display assembly 40. In an embodiment, the display 50 is positioned so that it is behind the coated glass article 10. Advantageously, in this position, the display 50 is concealed by the reflectance and mirror-like appearance of the coated glass article 10 of the display assembly 40 when the display 50 is not in use and, when the display 50 is in use, a display image is visible through the coated glass article 10 and the quality of the display image visible through the display assembly 40 is bright and sharp under a broad spectrum of ambient light conditions.

The display assembly 40 also comprises a frame member 44. The coated glass article 10 is provided within and, preferably, secured to the frame member 44. Within the frame member 44, the coated glass article 10 is positioned so that the coating 14 may face out and away from the mounting member 42 and the display 50. A portion of the frame member covers a perimeter of the coating 14. In other embodiments (not depicted), the coated glass article is positioned within the frame member so that the coating faces the mounting member.

The frame member 44 can be formed of wood, metal, plastic or another suitably rigid material. In certain embodiments like the one shown in FIG. 2, the frame member 44 has an outer surface 46 that is substantially square-shaped. In this embodiment, the frame member 44 comprises four rails 48 and each rail 48 is attached to a pair of rails and is provided in a perpendicular relationship with the pair of rails attached thereto. However, in other embodiments (not depicted), the frame member may have an outer surface which is of another geometric shape and/or comprise more or less than four rails.

EXAMPLES

The following examples are presented solely for the purpose of further illustrating and disclosing the embodiments of the coated glass article and display assembly.

Examples of coated glass articles within the scope of the invention are described below and illustrated in TABLEs 1-4. In TABLEs 1-4, the coated glass articles within the scope of the invention are Ex 1-Ex 135.

The coated glass articles of Ex 1-Ex 3 are described below and illustrated in TABLE 1. The following experimental conditions are applicable to Ex 1-Ex 3. For Ex 1-Ex 3, a coating was deposited on a first major surface of a glass substrate as the glass substrate was being formed and moving in conjunction with the float glass manufacturing process. The glass substrate was of a soda-lime-silica composition. For Ex 1-Ex 3, the thickness of the glass substrate was 1.6 mm. The coating was formed by depositing a first coating layer, second coating layer, third coating layer and fourth coating layer. Each coating layer was formed by utilizing an APCVD process.

For Ex 1-Ex 3, the first coating layer was an inorganic metal oxide layer of pyrolytic tin oxide. The tin oxide coating layer was deposited directly on the first major surface of the glass substrate. After depositing the first coating layer, the second coating layer was deposited. The second coating layer was an inorganic metal oxide layer of pyrolytic silicon dioxide. The silicon dioxide coating layer was deposited directly on the first coating layer.

After depositing the second coating layer, the third coating layer was deposited. The third coating layer was an inorganic metal oxide layer of pyrolytic tin oxide. The tin oxide coating layer was deposited directly on the second coating layer. After depositing the third coating layer, the fourth coating layer was deposited. The fourth coating layer was an inorganic metal oxide layer of pyrolytic titanium dioxide. The titanium dioxide coating layer was deposited directly on the third coating layer.

Thus, the coated glass articles of Ex 1-Ex 3 are of a glass/$SnO_2$/$SiO_2$/$SnO_2$/$TiO_2$ arrangement. The thicknesses of the coating layers of Ex 1-Ex 3 are reported in TABLE 1 in nanometers and were calculated via optical modeling. The haze, total visible light transmittance (Tvis) (Illuminant C), transmitted color (Ta*, Tb*), glass side visible light reflectance (Rg) (Illuminant C), film side visible light reflectance (Rf) (Illuminant C) and reflected color (Ra*, Rb*) of the coated glass articles of Ex 1-Ex 3 are also reported in TABLE 1. The haze was measured on the coating side of the coated glass article using a haze meter and is expressed as a percentage. The total visible light transmittance and transmitted color were measured on the coating side of the coated glass article using a spectrophotometer. The total visible light transmittance is expressed as a percentage. The glass side visible light reflectance was measured on the uncoated side of the coated glass article using a spectrophotometer. The film side visible light reflectance and reflected color were measured on the coating side of the coated glass article using a spectrophotometer. The glass side visible light reflectance and film &de visible light reflectance are expressed as a percentage.

TABLE 1

| Examples | SnO$_2$ | SiO$_2$ | SnO$_2$ | TiO$_2$ | Haze | Tvis | Ta* | Tb* | Rg | Rf | Ra* | Rb* |
|---|---|---|---|---|---|---|---|---|---|---|---|---|
| Ex 1 | 29.7 | 84.4 | 29.8 | 35.8 | 0.84 | 52.5 | 6.3 | 5.0 | 42.6 | 44.6 | −7.8 | −2.8 |
| Ex 2 | 30.2 | 80.9 | 30.0 | 41.7 | 0.85 | 50.4 | 6.9 | 0.7 | 44.6 | 46.8 | −8.1 | 2.5 |
| Ex 3 | 30.6 | 82.4 | 30.4 | 42.3 | 0.91 | 50.4 | 6.9 | −1.1 | 46.5 | 46.5 | −8.0 | 3.5 |

As shown in TABLE 1, the coated glass articles of Ex1-Ex 3 exhibit similar visible light transmittance and reflectance properties. For example, the coated glass articles of Ex 1-Ex 3 exhibited a total visible light transmittance of more than 50%, a film side visible light reflectance of more than 42% and a glass side visible light reflectance of more than 42%. It should also be noted that the coated glass articles of Ex1-Ex 3 exhibited a total visible light transmittance of 45-55%, a film side visible light reflectance of 42-50% and a glass side visible light reflectance of 42-50%. Also, the coated glass articles of Ex 1-Ex 3 exhibited other properties which are advantageous. For example, the coated glass articles of Ex 1-Ex 3 exhibited haze below 1%.

The coated glass articles of Ex 4-Ex 47 are described below and illustrated in TABLE 2. The coated glass articles of Ex 4-Ex 47 are predictive and were modeled utilizing input parameters similar to those reported for Ex 1-Ex 3. Each of the coated glass articles of Ex 4-Ex 47 comprised a glass substrate. Each glass substrate had a thickness of 1.6 mm and a soda-lime-silica composition. Each of the coated glass articles of Ex 4-Ex 47 also comprised a coating deposited on a first major surface of the glass substrate. Each coating comprised a first coating layer, second coating layer, third coating layer and fourth coating layer.

For each of the of the coated glass articles of Ex 4-Ex 47, the first coating layer is deposited on the glass substrate and is an inorganic metal oxide layer of tin oxide. The second coating layer is deposited on the first coating layer and is an inorganic metal oxide layer of silicon dioxide. The third coating layer is deposited on the second coating layer and is an inorganic metal oxide layer of tin oxide. The fourth coating layer is deposited on the third coating layer and is an inorganic metal oxide layer of titanium dioxide.

Thus, the coated glass articles of Ex 4-Ex 47 are of a glass/SnO$_2$/SiO$_2$/SnO$_2$/TiO$_2$ arrangement. The thicknesses of the coating layers of Ex 4-Ex 47 are reported in TABLE 2 in nanometers. The total visible light transmittance (Tvis) (Illuminant C), transmitted color (Ta*, Tb*), glass side visible light reflectance (Rg) (Illuminant C), film side visible light reflectance (Rf) (Illuminant C) and reflected color (Ra*, Rb*) of the coated glass articles of Ex 4-Ex 47 are also reported in TABLE 2. The total visible light transmittance, transmitted color, glass side visible light reflectance, film side visible light reflectance and reflected color of the coated glass articles of Ex 4-Ex 47 were calculated by optical modeling. The total visible light transmittance, glass side visible light reflectance and film side visible light reflectance are expressed as percentages.

TABLE 2

| Examples | SnO$_2$ | SiO$_2$ | SnO$_2$ | TiO$_2$ | Tvis | Ta* | Tb* | Rg | Rf | Ra* | Rb* |
|---|---|---|---|---|---|---|---|---|---|---|---|
| Ex 4 | 27.0 | 80.0 | 30.0 | 40.0 | 54.5 | 5.5 | 4.0 | 44.0 | 44.6 | −7.0 | −3.9 |
| Ex 5 | 27.6 | 80.0 | 30.0 | 40.0 | 54.2 | 5.5 | 3.3 | 44.2 | 44.8 | −7.0 | −3.1 |
| Ex 6 | 28.2 | 80.0 | 30.0 | 40.0 | 55.2 | 5.2 | 3.3 | 44.4 | 43.9 | −6.9 | −3.1 |
| Ex 7 | 28.8 | 80.0 | 30.0 | 40.0 | 53.4 | 5.6 | 2.8 | 44.5 | 45.7 | −7.0 | −2.5 |
| Ex 8 | 29.4 | 80.0 | 30.0 | 40.0 | 54.8 | 5.4 | 2.7 | 44.7 | 44.2 | −7.0 | −2.5 |
| Ex 9 | 30.0 | 80.0 | 30.0 | 40.0 | 54.1 | 5.6 | 2.5 | 44.9 | 45.0 | −7.1 | −2.3 |
| Ex 10 | 30.6 | 80.0 | 30.0 | 40.0 | 53.4 | 5.7 | 2.2 | 45.1 | 45.7 | −7.1 | −2.0 |
| Ex 11 | 31.2 | 80.0 | 30.0 | 40.0 | 54.5 | 5.5 | 2.1 | 45.3 | 44.6 | −7.1 | −1.8 |
| Ex 12 | 31.8 | 80.0 | 30.0 | 40.0 | 53.9 | 5.7 | 1.7 | 45.4 | 45.2 | −7.2 | −1.4 |
| Ex 13 | 32.4 | 80.0 | 30.0 | 40.0 | 53.5 | 5.7 | 1.7 | 45.6 | 45.6 | −7.1 | −1.4 |
| Ex 14 | 33.0 | 80.0 | 30.0 | 40.0 | 54.2 | 5.6 | 1.4 | 45.8 | 44.9 | −7.2 | −1.1 |
| Ex 15 | 30.0 | 72.0 | 30.0 | 40.0 | 53.5 | 5.8 | 1.2 | 43.3 | 45.6 | −7.2 | −0.8 |
| Ex 16 | 30.0 | 73.6 | 30.0 | 40.0 | 53.7 | 5.8 | 0.9 | 43.7 | 45.3 | −7.2 | −0.5 |
| Ex 17 | 30.0 | 75.2 | 30.0 | 40.0 | 53.9 | 5.7 | 0.8 | 44.0 | 45.2 | −7.2 | −0.3 |
| Ex 18 | 30.0 | 76.8 | 30.0 | 40.0 | 53.6 | 5.8 | 0.6 | 44.3 | 45.5 | −7.3 | −0.2 |
| Ex 19 | 30.0 | 78.4 | 30.0 | 40.0 | 54.6 | 5.3 | 0.5 | 44.6 | 44.5 | −6.9 | 0.0 |
| Ex 20 | 30.0 | 80.0 | 30.0 | 40.0 | 54.4 | 5.4 | 0.4 | 44.9 | 44.7 | −7.0 | 0.1 |
| Ex 21 | 30.0 | 81.6 | 30.0 | 40.0 | 54.2 | 5.5 | 0.3 | 45.2 | 44.9 | −7.1 | 0.1 |
| Ex 22 | 30.0 | 83.2 | 30.0 | 40.0 | 54.0 | 5.6 | 0.3 | 45.4 | 45.1 | −7.2 | 0.2 |
| Ex 23 | 30.0 | 84.8 | 30.0 | 40.0 | 53.8 | 5.7 | 0.2 | 45.6 | 45.3 | −7.2 | 0.3 |
| Ex 24 | 30.0 | 86.4 | 30.0 | 40.0 | 53.6 | 5.8 | 0.1 | 45.8 | 45.5 | −7.3 | 0.4 |
| Ex 25 | 30.0 | 88.0 | 30.0 | 40.0 | 53.6 | 5.8 | 0.1 | 46.0 | 45.5 | −7.3 | 0.4 |
| Ex 26 | 30.0 | 80.0 | 27.0 | 40.0 | 53.6 | 5.8 | 0.1 | 45.1 | 45.5 | −7.3 | 0.4 |
| Ex 27 | 30.0 | 80.0 | 27.6 | 40.0 | 53.6 | 5.8 | 0.1 | 45.1 | 45.5 | −7.3 | 0.4 |
| Ex 28 | 30.0 | 80.0 | 28.2 | 40.0 | 53.4 | 5.9 | 0.0 | 45.1 | 45.6 | −7.4 | 0.5 |
| Ex 29 | 30.0 | 80.0 | 28.8 | 40.0 | 53.3 | 6.0 | −0.1 | 45.0 | 45.8 | −7.5 | 0.7 |
| Ex 30 | 30.0 | 80.0 | 29.4 | 40.0 | 53.1 | 6.1 | −0.2 | 45.0 | 46.0 | −7.5 | 0.8 |
| Ex 31 | 30.0 | 80.0 | 30.0 | 40.0 | 52.9 | 6.2 | −0.3 | 44.9 | 46.2 | −7.6 | 0.9 |
| Ex 32 | 30.0 | 80.0 | 30.6 | 40.0 | 52.7 | 6.3 | −0.4 | 44.8 | 46.4 | −7.7 | 1.0 |
| Ex 33 | 30.0 | 80.0 | 31.2 | 40.0 | 53.7 | 5.9 | −0.4 | 44.8 | 45.4 | −7.4 | 1.1 |
| Ex 34 | 30.0 | 80.0 | 31.8 | 40.0 | 53.4 | 5.9 | −0.6 | 44.7 | 45.7 | −7.4 | 1.2 |
| Ex 35 | 30.0 | 80.0 | 32.4 | 40.0 | 53.5 | 5.9 | −0.7 | 44.6 | 45.6 | −7.4 | 1.4 |

TABLE 2-continued

| Examples | SnO$_2$ | SiO$_2$ | SnO$_2$ | TiO$_2$ | Tvis | Ta* | Tb* | Rg | Rf | Ra* | Rb* |
|---|---|---|---|---|---|---|---|---|---|---|---|
| Ex 36 | 30.0 | 80.0 | 33.0 | 40.0 | 53.8 | 5.9 | −1.0 | 44.5 | 45.3 | −7.5 | 1.7 |
| Ex 37 | 30.0 | 80.0 | 30.0 | 36.0 | 53.1 | 6.0 | −1.3 | 44.0 | 46.0 | −7.5 | 2.0 |
| Ex 38 | 30.0 | 80.0 | 30.0 | 36.8 | 53.9 | 5.9 | −1.5 | 44.3 | 45.2 | −7.5 | 2.4 |
| Ex 39 | 30.0 | 80.0 | 30.0 | 37.6 | 53.5 | 6.0 | −1.6 | 44.5 | 45.6 | −7.5 | 2.4 |
| Ex 40 | 30.0 | 80.0 | 30.0 | 38.4 | 52.9 | 6.1 | −2.0 | 44.6 | 46.2 | −7.5 | 2.8 |
| Ex 41 | 30.0 | 80.0 | 30.0 | 39.2 | 54.0 | 6.0 | −2.1 | 44.8 | 45.1 | −7.6 | 3.1 |
| Ex 42 | 30.0 | 80.0 | 30.0 | 40.0 | 53.4 | 6.0 | −2.5 | 44.9 | 45.7 | −7.6 | 3.5 |
| Ex 43 | 30.0 | 80.0 | 30.0 | 40.8 | 54.1 | 6.0 | −2.7 | 45.0 | 45.0 | −7.7 | 3.8 |
| Ex 44 | 30.0 | 80.0 | 30.0 | 41.6 | 52.7 | 6.2 | −2.7 | 45.1 | 46.4 | −7.6 | 3.6 |
| Ex 45 | 30.0 | 80.0 | 30.0 | 42.4 | 53.4 | 6.1 | −3.3 | 45.1 | 45.7 | −7.7 | 4.5 |
| Ex 46 | 30.0 | 80.0 | 30.0 | 43.2 | 52.6 | 6.3 | −3.4 | 45.2 | 46.5 | −7.7 | 4.5 |
| Ex 47 | 30.0 | 80.0 | 30.0 | 44.0 | 53.4 | 6.2 | −4.2 | 45.2 | 45.7 | −7.8 | 5.7 |

As shown in TABLE 2, the coated glass articles of Ex 4-Ex 47 exhibit similar visible light transmittance and reflectance properties. For example, the coated glass articles of Ex 4-Ex 47 exhibited a total visible light transmittance of more than 50%, a film side visible light reflectance of more than 42% and a glass side visible light reflectance of more than 42%. It should also be noted that the coated glass articles of Ex 4-Ex 5 and Ex 7-Ex 47 exhibited a total visible light transmittance of about 50-55%, a film side visible light reflectance of 42-50% and a glass side visible light reflectance of 42-50%. Also, the coated glass articles of Ex 4-Ex 47 exhibited other properties which are advantageous. For example, the coated glass articles of Ex 4-Ex 29, Ex 33-Ex 39 and Ex 41-Ex 43 exhibited a neutral color in the visible light transmitted therethrough.

The coated glass articles of Ex 48-Ex 91 are described below and illustrated in TABLE 3. The coated glass articles of Ex 48-Ex 91 are predictive and were modeled utilizing input parameters similar to those reported for Ex 1-Ex 3. Each of the coated glass articles of Ex 48-Ex 91 comprised a glass substrate. Each glass substrate had a thickness of 1.6 mm and a soda-lime-silica composition. Each of the coated glass articles of Ex 48-Ex 91 also comprised a coating deposited on a first major surface of the glass substrate. Each coating comprised a first coating layer, second coating layer, third coating layer and fourth coating layer.

For each of the of the coated glass articles of Ex 48-Ex 91, the first coating layer is deposited on the glass substrate and is an inorganic metal oxide layer of tin oxide. The second coating layer is deposited on the first coating layer and is an inorganic metal oxide layer of silicon dioxide. The third coating layer is deposited on the second coating layer and is an inorganic metal oxide layer of tin oxide. The fourth coating layer is deposited on the third coating layer and is an inorganic metal oxide layer of chromium oxide.

Thus, the coated glass articles of Ex 48-Ex 91 are of a glass/SnO$_2$/SiO$_2$/SnO$_2$/Cr$_2$O$_3$ arrangement. The thicknesses of the coating layers of Ex 48-Ex 91 are reported in TABLE 3 in nanometers. The total visible light transmittance (Tvis) (Illuminant C), transmitted color (Ta*, Tb*), glass side visible light reflectance (Rg) (Illuminant C), film side visible light reflectance (Rf) (Illuminant C) and reflected color (Ra*, Rb*) of the coated glass articles of Ex 48-Ex 91 are also reported in TABLE 3. The total visible light transmittance, transmitted color, glass side visible light reflectance, film side visible light reflectance and reflected color of the coated glass articles of Ex 48-Ex 91 were calculated by optical modeling. The total visible light transmittance, glass side visible light reflectance and film side visible light reflectance are expressed as percentages.

TABLE 3

| Examples | SnO$_2$ | SiO$_2$ | SnO$_2$ | Cr$_2$O$_3$ | Tvis | Ta* | Tb* | Rg | Rf | Ra* | Rb* |
|---|---|---|---|---|---|---|---|---|---|---|---|
| Ex 48 | 405 | 950 | 300 | 400 | 54.2 | 4.6 | −1.0 | 36.3 | 39.7 | −8.3 | 3.4 |
| Ex 49 | 414 | 950 | 300 | 400 | 54.0 | 4.7 | −1.2 | 36.6 | 39.9 | −8.4 | 3.8 |
| Ex 50 | 423 | 950 | 300 | 400 | 53.8 | 4.8 | −1.5 | 36.8 | 40.2 | −8.5 | 4.2 |
| Ex 51 | 432 | 950 | 300 | 400 | 53.6 | 4.8 | −1.7 | 37.0 | 40.4 | −8.6 | 4.5 |
| Ex 52 | 441 | 950 | 300 | 400 | 53.4 | 4.9 | −2.0 | 37.2 | 40.6 | −8.7 | 4.9 |
| Ex 53 | 450 | 950 | 300 | 400 | 53.2 | 4.9 | −2.3 | 37.5 | 40.8 | −8.7 | 5.3 |
| Ex 54 | 459 | 950 | 300 | 400 | 53.1 | 5.0 | −2.5 | 37.7 | 41.0 | −8.8 | 5.7 |
| Ex 55 | 468 | 950 | 300 | 400 | 52.9 | 5.0 | −2.8 | 37.9 | 41.2 | −8.9 | 6.1 |
| Ex 56 | 477 | 950 | 300 | 400 | 52.7 | 5.1 | −3.1 | 38.1 | 41.4 | −8.9 | 6.5 |
| Ex 57 | 486 | 950 | 300 | 400 | 52.5 | 5.1 | −3.4 | 38.2 | 41.5 | −9.0 | 6.9 |
| Ex 58 | 495 | 950 | 300 | 400 | 52.4 | 5.1 | −3.7 | 38.4 | 41.7 | −9.0 | 7.4 |
| Ex 59 | 450 | 855 | 300 | 400 | 54.2 | 4.8 | 1.7 | 36.2 | 39.5 | −8.3 | −0.7 |
| Ex 60 | 450 | 874 | 300 | 400 | 54.0 | 4.8 | 0.9 | 36.5 | 39.8 | −8.4 | 0.4 |
| Ex 61 | 450 | 893 | 300 | 400 | 53.7 | 4.9 | 0.1 | 36.8 | 40.1 | −8.5 | 1.6 |
| Ex 62 | 450 | 912 | 300 | 400 | 53.5 | 4.9 | −0.7 | 37.1 | 40.4 | −8.6 | 2.8 |
| Ex 63 | 450 | 931 | 300 | 400 | 53.4 | 4.9 | −1.5 | 37.3 | 40.6 | −8.7 | 4.0 |
| Ex 64 | 450 | 95 | 300 | 400 | 53.2 | 4.9 | −2.3 | 37.4 | 40.8 | −8.7 | 5.3 |
| Ex 65 | 450 | 969 | 300 | 400 | 53.1 | 4.9 | −3.1 | 37.6 | 40.9 | −8.8 | 6.6 |
| Ex 66 | 450 | 988 | 300 | 400 | 53.1 | 4.9 | −3.8 | 37.7 | 41.1 | −8.8 | 7.9 |
| Ex 67 | 450 | 1007 | 300 | 400 | 53.0 | 4.9 | −4.6 | 37.7 | 41.1 | −8.9 | 9.3 |
| Ex 68 | 450 | 1026 | 300 | 400 | 53.0 | 4.8 | −5.4 | 37.8 | 41.2 | −8.9 | 10.8 |
| Ex 69 | 450 | 1045 | 300 | 400 | 53.0 | 4.7 | −6.1 | 37.8 | 41.2 | −8.9 | 12.2 |
| Ex 70 | 450 | 800 | 270 | 400 | 53.2 | 0.5 | 4.9 | 37.5 | 40.6 | −8.4 | 1.8 |
| Ex 71 | 450 | 800 | 276 | 400 | 53.2 | 0.5 | 4.9 | 37.5 | 40.6 | −8.5 | 2.4 |
| Ex 72 | 450 | 800 | 282 | 400 | 53.2 | 0.5 | 4.9 | 37.5 | 40.7 | −8.5 | 3.1 |

TABLE 3-continued

| Examples | SnO2 | SiO2 | SnO2 | Cr2O3 | Tvis | Ta* | Tb* | Rg | Rf | Ra* | Rb* |
|---|---|---|---|---|---|---|---|---|---|---|---|
| Ex 73 | 450 | 800 | 288 | 400 | 53.2 | 0.5 | 4.9 | 37.5 | 40.7 | −8.6 | 3.8 |
| Ex 74 | 450 | 800 | 294 | 400 | 53.2 | 0.5 | 4.9 | 37.5 | 40.8 | −8.7 | 4.5 |
| Ex 75 | 450 | 800 | 300 | 400 | 53.2 | 0.5 | 4.9 | 37.4 | 40.8 | −8.7 | 5.3 |
| Ex 76 | 450 | 800 | 306 | 400 | 53.3 | 0.5 | 4.9 | 37.4 | 40.8 | −8.8 | 6.0 |
| Ex 77 | 450 | 800 | 312 | 400 | 53.3 | 0.5 | 4.9 | 37.4 | 40.8 | −8.8 | 6.8 |
| Ex 78 | 450 | 800 | 318 | 400 | 53.4 | 0.5 | 4.9 | 37.3 | 40.8 | −8.9 | 7.6 |
| Ex 79 | 450 | 800 | 324 | 400 | 53.4 | 0.5 | 4.9 | 37.2 | 40.7 | −9.0 | 8.4 |
| Ex 80 | 450 | 800 | 330 | 400 | 53.5 | 0.5 | 4.9 | 37.2 | 40.7 | −9.0 | 9.2 |
| Ex 81 | 450 | 800 | 300 | 360 | 53.8 | 5.0 | 0.4 | 37.3 | 40.6 | −8.4 | 0.6 |
| Ex 82 | 450 | 800 | 300 | 368 | 53.7 | 5.0 | −0.1 | 37.3 | 40.7 | −8.5 | 1.5 |
| Ex 83 | 450 | 800 | 300 | 376 | 53.5 | 5.0 | −0.7 | 37.4 | 40.7 | −8.5 | 2.4 |
| Ex 84 | 450 | 800 | 300 | 384 | 53.4 | 5.0 | −1.2 | 37.4 | 40.8 | −8.6 | 3.3 |
| Ex 85 | 450 | 800 | 300 | 392 | 53.3 | 5.0 | −1.7 | 37.4 | 40.8 | −8.7 | 4.3 |
| Ex 86 | 450 | 800 | 300 | 400 | 53.2 | 4.9 | −2.3 | 37.4 | 40.8 | −8.7 | 5.3 |
| Ex 87 | 450 | 800 | 300 | 408 | 53.2 | 4.9 | −2.8 | 37.4 | 40.8 | −8.8 | 6.3 |
| Ex 88 | 450 | 800 | 300 | 416 | 53.1 | 4.9 | −3.3 | 37.4 | 40.7 | −8.8 | 7.3 |
| Ex 89 | 450 | 800 | 300 | 424 | 53.1 | 4.8 | −3.8 | 37.4 | 40.7 | −8.9 | 8.4 |
| Ex 90 | 450 | 800 | 300 | 432 | 53.1 | 4.8 | −4.3 | 37.3 | 40.6 | −9.0 | 9.5 |
| Ex 91 | 450 | 800 | 300 | 440 | 53.1 | 4.7 | −4.8 | 37.2 | 40.5 | −9.0 | 10.7 |

As shown in TABLE 3, the coated glass articles of Ex 48-Ex 91 exhibit similar visible light transmittance and reflectance properties. For example, the coated glass articles of Ex 48-Ex 91 exhibited a total visible light transmittance of more than 50%, a film side visible light reflectance of more than 30% and a glass side visible light reflectance of 35% or more. In fact, the coated glass articles of Ex 48-Ex 91 exhibited a film side visible light reflectance of 35% or more. It should also be noted that the coated glass articles of Ex 48-Ex 91 exhibited a total visible light transmittance of 50-55%, a film side visible light reflectance of 35-45% and a glass side visible light reflectance of 35-45%. Also, the coated glass articles of Ex 48-Ex 91 exhibited other properties which are advantageous. For example, the coated glass articles of Ex 48-Ex 68 and Ex 70-Ex 91 exhibited a neutral color in the visible light transmitted therethrough.

The coated glass articles of Ex 92-Ex 135 are described below and illustrated in TABLE 4. The coated glass articles of Ex 92-Ex 135 are predictive and were modeled utilizing input parameters similar to those reported for Ex 1-Ex 3. Each of the coated glass articles of Ex 92-Ex 135 comprised a glass substrate. Each glass substrate had a thickness of 1.6 mm and a soda-lime-silica composition. Each of the coated glass articles of Ex 92-Ex 135 also comprised a coating deposited on a first major surface of the glass substrate. Each coating comprised a first coating layer, second coating layer, third coating layer and fourth coating layer. For each of the of the coated glass articles of Ex 92-Ex 135, the first coating layer is deposited on the glass substrate and is an inorganic metal oxide layer of tin oxide. The second coating layer is deposited on the first coating layer and is an inorganic metal oxide layer of silicon dioxide. The third coating layer is deposited on the second coating layer and is an inorganic metal oxide layer of tin oxide. The fourth coating layer is deposited on the third coating layer and is an inorganic metal oxide layer of niobium oxide.

Thus, the coated glass articles of Ex 92-Ex 135 are of a glass/SnO2/SiO2/SnO2/Nb2O5 arrangement. The thicknesses of the coating layers of Ex 92-Ex 135 are reported in TABLE 4 in nanometers. The total visible light transmittance (Tvis) (Illuminant C), transmitted color (Ta*, Tb*), glass side visible light reflectance (Rg) (Illuminant C), film side visible light reflectance (Rf) (Illuminant C) and reflected color (Ra*, Rb*) of the coated glass articles of Ex 92-Ex 135 are also reported in TABLE 4. The total visible light transmittance, transmitted color, glass side visible light reflectance, film side visible light reflectance and reflected color of the coated glass articles of Ex 92-Ex 135 were calculated by optical modeling. The total visible light transmittance, glass side visible light reflectance and film side visible light reflectance are expressed as percentages.

TABLE 4

| Examples | SnO2 | SiO2 | SnO2 | Nb2O5 | Tvis | Ta* | Tb* | Rg | Rf | Ra* | Rb* |
|---|---|---|---|---|---|---|---|---|---|---|---|
| Ex 92 | 405 | 800 | 300 | 400 | 54.3 | 6.4 | −0.1 | 44.2 | 44.9 | −8.2 | 0.7 |
| Ex 93 | 414 | 800 | 300 | 400 | 54.0 | 6.6 | −0.4 | 44.5 | 45.2 | −8.3 | 0.9 |
| Ex 94 | 423 | 800 | 300 | 400 | 53.7 | 6.7 | −0.6 | 44.7 | 45.4 | −8.4 | 1.2 |
| Ex 95 | 432 | 800 | 300 | 400 | 53.5 | 6.7 | −0.9 | 45.0 | 45.7 | −8.4 | 1.5 |
| Ex 96 | 441 | 800 | 300 | 400 | 53.2 | 6.8 | −1.2 | 45.2 | 45.9 | −8.5 | 1.8 |
| Ex 97 | 450 | 800 | 300 | 400 | 53.0 | 6.9 | −1.4 | 45.5 | 46.1 | −8.5 | 2.1 |
| Ex 98 | 459 | 800 | 300 | 400 | 52.8 | 7.0 | −1.7 | 45.7 | 46.4 | −8.6 | 2.5 |
| Ex 99 | 468 | 800 | 300 | 400 | 52.5 | 7.1 | −2.0 | 45.9 | 46.6 | −8.7 | 2.8 |
| Ex 100 | 477 | 800 | 300 | 400 | 52.3 | 7.2 | −2.3 | 46.1 | 46.8 | −8.7 | 3.2 |
| Ex 101 | 486 | 800 | 300 | 400 | 52.1 | 7.3 | −2.7 | 46.4 | 47.0 | −8.7 | 3.5 |
| Ex 102 | 495 | 800 | 300 | 400 | 51.9 | 7.3 | −3.0 | 46.6 | 47.2 | −8.8 | 3.9 |
| Ex 103 | 450 | 720 | 300 | 400 | 54.7 | 6.5 | 2.5 | 43.7 | 44.6 | −8.3 | −2.3 |
| Ex 104 | 450 | 736 | 300 | 400 | 54.3 | 6.6 | 1.7 | 44.1 | 45.0 | −8.4 | −1.4 |
| Ex 105 | 450 | 752 | 300 | 400 | 53.9 | 6.7 | 1.0 | 44.5 | 45.3 | −8.4 | −0.6 |
| Ex 106 | 450 | 768 | 300 | 400 | 53.6 | 6.8 | 0.2 | 44.8 | 45.6 | −8.5 | 0.3 |
| Ex 107 | 450 | 784 | 300 | 400 | 53.3 | 6.9 | −0.6 | 45.1 | 45.9 | −8.5 | 1.2 |
| Ex 108 | 450 | 800 | 300 | 400 | 53.0 | 6.9 | −1.4 | 45.4 | 46.1 | −8.5 | 2.1 |
| Ex 109 | 450 | 816 | 300 | 400 | 52.7 | 7.0 | −2.2 | 45.7 | 46.3 | −8.6 | 3.1 |

TABLE 4-continued

| Examples | SnO2 | SiO2 | SnO2 | Nb2O5 | Tvis | Ta* | Tb* | Rg | Rf | Ra* | Rb* |
|---|---|---|---|---|---|---|---|---|---|---|---|
| Ex 110 | 450 | 832 | 300 | 400 | 52.5 | 7.1 | −3.1 | 46.0 | 46.5 | −8.6 | 4.0 |
| Ex 111 | 450 | 848 | 300 | 400 | 52.3 | 7.1 | −3.9 | 46.2 | 46.7 | −8.7 | 5.0 |
| Ex 112 | 450 | 864 | 300 | 400 | 52.1 | 7.2 | −4.8 | 46.4 | 46.9 | −8.7 | 6.1 |
| Ex 113 | 450 | 880 | 300 | 400 | 52.0 | 7.2 | −5.6 | 46.5 | 47.0 | −8.7 | 7.1 |
| Ex 114 | 450 | 800 | 270 | 400 | 52.9 | 6.8 | 1.4 | 45.5 | 46.3 | −8.3 | −1.1 |
| Ex 115 | 450 | 800 | 276 | 400 | 52.9 | 6.8 | 0.9 | 45.5 | 46.3 | −8.3 | −0.5 |
| Ex 116 | 450 | 800 | 282 | 400 | 52.9 | 6.8 | 0.3 | 45.5 | 46.3 | −8.4 | 0.2 |
| Ex 117 | 450 | 800 | 288 | 400 | 52.9 | 6.9 | −0.3 | 45.5 | 46.2 | −8.4 | 0.8 |
| Ex 118 | 450 | 800 | 294 | 400 | 53.0 | 6.9 | −0.8 | 45.5 | 46.2 | −8.5 | 1.5 |
| Ex 119 | 450 | 800 | 300 | 400 | 53.0 | 6.9 | −1.4 | 45.4 | 46.1 | −8.5 | 2.1 |
| Ex 120 | 450 | 800 | 306 | 400 | 53.0 | 7.0 | −2.0 | 45.4 | 46.0 | −8.6 | 2.8 |
| Ex 121 | 450 | 800 | 312 | 400 | 53.1 | 7.0 | −2.6 | 45.4 | 46.0 | −8.7 | 3.5 |
| Ex 122 | 450 | 800 | 318 | 400 | 53.2 | 7.0 | −3.2 | 45.3 | 45.9 | −8.7 | 4.3 |
| Ex 123 | 450 | 800 | 324 | 400 | 53.2 | 7.0 | −3.8 | 45.2 | 45.8 | −8.8 | 5.0 |
| Ex 124 | 450 | 800 | 330 | 400 | 53.3 | 7.1 | −4.3 | 45.2 | 45.7 | −8.8 | 5.8 |
| Ex 125 | 450 | 800 | 300 | 360 | 53.8 | 6.7 | 2.5 | 44.6 | 45.4 | −8.4 | −2.3 |
| Ex 126 | 450 | 800 | 300 | 368 | 53.6 | 6.7 | 1.7 | 44.8 | 45.6 | −8.4 | −1.4 |
| Ex 127 | 450 | 800 | 300 | 376 | 53.4 | 6.8 | 1.0 | 45.0 | 45.8 | −8.4 | −0.6 |
| Ex 128 | 450 | 800 | 300 | 384 | 53.3 | 6.8 | 0.2 | 45.2 | 45.9 | −8.5 | 0.3 |
| Ex 129 | 450 | 800 | 300 | 392 | 53.1 | 6.9 | −0.6 | 45.3 | 46.0 | −8.5 | 1.2 |
| Ex 130 | 450 | 800 | 300 | 400 | 53.0 | 6.9 | −1.4 | 45.4 | 46.1 | −8.5 | 2.1 |
| Ex 131 | 450 | 800 | 300 | 408 | 52.9 | 7.0 | −2.2 | 45.6 | 46.2 | −8.6 | 3.1 |
| Ex 132 | 450 | 800 | 300 | 416 | 52.8 | 7.0 | −3.1 | 45.6 | 46.2 | −8.6 | 4.1 |
| Ex 133 | 450 | 800 | 300 | 424 | 52.8 | 7.1 | −3.9 | 45.7 | 46.2 | −8.7 | 5.1 |
| Ex 134 | 450 | 800 | 300 | 432 | 52.7 | 7.1 | −4.7 | 45.7 | 46.2 | −8.8 | 6.2 |
| Ex 135 | 450 | 800 | 300 | 440 | 52.7 | 7.1 | −5.6 | 45.8 | 46.2 | −8.8 | 7.3 |

As shown in TABLE 4, the coated glass articles of Ex 92-Ex 135 exhibit similar visible light transmittance and reflectance properties. For example, the coated glass articles of Ex 92-Ex 135 exhibited a total visible light transmittance of more than 50%, a film side visible light reflectance of more than 42% and a glass side visible light reflectance of more than 42%. It should also be noted that the coated glass articles of Ex 93-Ex 102 and Ex 104-Ex 135 exhibited a total visible light transmittance of 50-55%, a film side visible light reflectance of about 45-55% and a glass side visible light reflectance of 42-50%. Also, the coated glass articles of Ex 92-Ex 135 exhibited other properties which are advantageous. For example, the coated glass articles of Ex 92-Ex 135 exhibited a non-neutral reflected and transmitted color.

The foregoing description is considered as illustrative only of the principles of the invention. Further, since numerous modifications and changes will readily occur to those skilled in the art, it is not desired to limit the invention to the exact construction and processes shown and described herein. Accordingly, all suitable modifications and equivalents may be considered as falling within the scope of the invention as defined by the claims which follow.

The invention claimed is:

1. A coated glass article comprising:
a glass substrate; and
a coating deposited over the glass substrate, wherein the coating comprises:
   i. a first inorganic metal oxide layer deposited over a major surface of the glass substrate, wherein the first inorganic metal oxide layer has a refractive index of less than 2.1,
   ii. a second inorganic metal oxide layer deposited over the first inorganic metal oxide layer, wherein the second inorganic metal oxide layer has a refractive index which is less than the refractive index of the first inorganic metal oxide layer,
   iii. a third inorganic metal oxide layer deposited directly on the second inorganic metal oxide layer at a thickness of 40 nm or less, wherein the third inorganic metal oxide layer comprises tin oxide,
   iv. a fourth inorganic metal oxide layer deposited over the third inorganic metal oxide layer, wherein the fourth inorganic metal oxide layer has a refractive index which is greater than a refractive index of the third inorganic metal oxide layer,
wherein the coated glass article exhibits a total visible light transmittance (Illuminant C) of 40% or more and a film side visible light reflectance (Illuminant C) of 30% or more.

2. The coated glass article of claim 1, wherein the refractive index of the fourth inorganic metal oxide layer is greater than the refractive index of the first inorganic metal oxide layer.

3. The coated glass article of claim 1, wherein the refractive index of the second inorganic metal oxide layer is 1.6 or less.

4. The coated glass article of claim 1, wherein the refractive index of the third inorganic metal oxide layer is greater than the refractive index of the second inorganic metal oxide layer.

5. The coated glass article of claim 1, wherein the refractive index of the fourth inorganic metal oxide layer is 2.1 or more.

6. The coated glass article of claim 1, wherein the first inorganic metal oxide layer comprises tin oxide.

7. The coated glass article of claim 1, wherein the second inorganic metal oxide layer comprises silicon dioxide.

8. The coated glass article of claim 1, wherein the fourth inorganic metal oxide layer comprises titanium dioxide, chromium oxide or niobium oxide.

9. The coated glass article of claim 1, wherein the coating consists of the first inorganic metal oxide layer, the second inorganic metal oxide layer, the third inorganic metal oxide layer, and the fourth inorganic metal oxide layer, and wherein the first inorganic metal oxide layer is deposited directly on the major surface of the glass substrate and the fourth inorganic metal oxide layer forms an outermost surface of the coating.

10. The coated glass article of claim 1, wherein the visible light reflectance (Illuminant C) of the coated glass article is 40% or more.

11. The coated glass article of claim 6, wherein the first inorganic metal oxide layer is deposited directly on the major surface of the glass substrate at a thickness of 20-60 nm.

12. The coated glass article of claim 7, wherein the second inorganic metal oxide layer is deposited directly on the first inorganic metal oxide layer at a thickness of 50-100 nm.

13. The coated glass article of claim 8, wherein the fourth inorganic metal oxide layer is deposited directly on the third inorganic metal oxide layer at a thickness of 30 nm or more.

14. The coated glass article of claim 8, wherein the fourth inorganic metal oxide layer comprises titanium dioxide and is deposited at a thickness of 30-60 nm.

15. The coated glass article of claim 1, wherein the third inorganic metal oxide layer is deposited at a thickness of 20-40 nm.

16. A display assembly, comprising:
a frame member; and
a coated glass article according to claim 1, wherein the coated glass article is secured to the frame member.

17. The display assembly of claim 16, wherein the coated glass article is positioned within the frame member and secured to the frame member so that a portion of the frame member covers a perimeter of the coating.

18. A method of making a display assembly comprising providing a display behind a coated glass article according to claim 1, such that when the display is in operation it is visible through the coated glass article and when the display is not in operation it is concealed by the coated glass article.

* * * * *